(12) United States Patent
Staker

(10) Patent No.: US 6,802,113 B2
(45) Date of Patent: Oct. 12, 2004

(54) ELECTRONIC CONTROL PEDAL POSITION SENSING DEVICE ASSEMBLY METHOD

(76) Inventor: William C. Staker, 17513 N. Fruitport Rd., Spring Lake, MI (US) 49456

( * ) Notice: Subject to any disclaimer, the term of this patent is extended or adjusted under 35 U.S.C. 154(b) by 81 days.

(21) Appl. No.: 10/218,672

(22) Filed: Aug. 14, 2002

(65) Prior Publication Data

US 2003/0051571 A1 Mar. 20, 2003

Related U.S. Application Data

(62) Division of application No. 09/698,581, filed on Oct. 27, 2000, now Pat. No. 6,460,429.
(60) Provisional application No. 60/162,609, filed on Oct. 29, 1999.

(51) Int. Cl.$^7$ ................................................. G01R 3/00
(52) U.S. Cl. ........................... 29/595; 29/592.1; 29/593; 29/426.6; 29/854; 74/512; 74/513; 74/560; 73/118.1; 123/361; 123/399
(58) Field of Search ................................. 29/592.1, 593, 29/595, 426.6, 832, 854; 74/512, 513, 560; 73/118.1; 123/361, 399

(56) References Cited

U.S. PATENT DOCUMENTS

| | | |
|---|---|---|
| 3,643,524 A | 2/1972 | Herring |
| 3,643,525 A | 2/1972 | Gibas |
| 3,691,868 A | 9/1972 | Smith |
| 3,754,480 A | 8/1973 | Bodnar et al. |
| 3,869,279 A | 3/1975 | Grimes et al. |
| 3,975,972 A | 8/1976 | Muhleck |
| 4,445,603 A | 5/1984 | Filsinger |
| 4,683,977 A | 8/1987 | Salmon |
| 4,695,819 A | 9/1987 | Bowsher |
| 4,819,500 A | 4/1989 | Musumiya et al. |
| 4,869,220 A | 9/1989 | Imoehl |

(List continued on next page.)

FOREIGN PATENT DOCUMENTS

| | | | |
|---|---|---|---|
| DE | 40 37 493 A1 | 6/1991 | |
| DE | 195 36 605 A1 | 4/1997 | |
| EP | 0 355 967 | 2/1990 | |
| JP | 62288343 A | * 12/1987 | ........... F02D/41/14 |
| WO | WO 98/14857 | 4/1998 | |

OTHER PUBLICATIONS

"A novel smart resistive–capacitive position sensor"; Xiujun Li; Meijer, G.C.M.; Instrumentation and Measurement, IEEE Transactions on, vol.: 44, Issue: 3, Jun. 1995; pp. 768–770.*

*Primary Examiner*—A. Dexter Tugbang
*Assistant Examiner*—Paul D. Kim
(74) *Attorney, Agent, or Firm*—Allen, Dyer, Doppelt, Milbrath & Gilchrist, P.A.

(57) ABSTRACT

A position sensor for an electronic control pedal is carried by the pedal mounting bracket and includes a linear potentiometer having a slider operable along a substrate in only a linear direction for providing an output voltage representative of slider displacement. A drive arm is connected to the pedal shaft for rotation during pedal movement. A coupler connected to the slider is slidable within a slot in the drive arm for providing the linear displacement through a rotational movement of the shaft. The drive arm has an inner arm in a telescoping connection with an outer arm for setting the drive arm at a desired length after potentiometer calibration. The longitudinal axis of the slot is at an non-zero angle to the longitudinal axis of the drive arm for desensitizing the sensor calibration and adjustment process.

14 Claims, 6 Drawing Sheets

U.S. PATENT DOCUMENTS

| | | |
|---|---|---|
| 4,870,871 A | 10/1989 | Ivan |
| 4,875,385 A | 10/1989 | Sitrin |
| 4,944,269 A | 7/1990 | Imoehl |
| 4,958,607 A | 9/1990 | Lundberg |
| 4,989,474 A | 2/1991 | Cicotte et al. |
| 5,010,782 A | 4/1991 | Asano et al. |
| 5,033,431 A | 7/1991 | Poirier et al. |
| 5,078,024 A | 1/1992 | Cicotte et al. |
| 5,086,663 A | 2/1992 | Asano et al. |
| 5,172,606 A | 12/1992 | Dzioba et al. |
| RE34,302 E | 7/1993 | Imoehl |
| RE34,574 E | 4/1994 | Imoehl |
| 5,351,573 A | 10/1994 | Cicotte |
| 5,385,068 A | 1/1995 | White et al. |
| 5,408,899 A | 4/1995 | Stewart |
| 5,416,295 A * | 5/1995 | White et al. ............... 200/86.5 |
| 5,445,125 A | 8/1995 | Allen |
| 5,460,061 A | 10/1995 | Redding et al. |
| 5,461,939 A | 10/1995 | Upton |
| 5,524,589 A | 6/1996 | Kikkawa et al. |
| 5,529,296 A | 6/1996 | Kato et al. |
| 5,602,732 A | 2/1997 | Nichols et al. |
| 5,632,183 A | 5/1997 | Rixon et al. |
| 5,661,890 A * | 9/1997 | Pfaffenberger ............. 29/426.6 |
| 5,673,668 A | 10/1997 | Pallett et al. |
| 5,676,220 A | 10/1997 | Dapsi et al. |
| 5,697,260 A | 12/1997 | Rixon et al. |
| 5,713,189 A | 2/1998 | Toman |
| 5,749,343 A | 5/1998 | Nichols et al. |
| 5,768,946 A * | 6/1998 | Fromer et al. ................ 74/514 |
| 5,894,762 A | 4/1999 | Arao et al. |
| 5,912,538 A | 6/1999 | Turner |
| 5,934,152 A | 8/1999 | Aschoff et al. |
| 5,937,707 A | 8/1999 | Rixon et al. |
| 5,950,597 A | 9/1999 | Kamio et al. |
| 5,976,056 A | 11/1999 | Matsumoto et al. |
| 5,996,438 A | 12/1999 | Elton |
| 6,006,722 A | 12/1999 | Hall |
| 6,017,290 A | 1/2000 | Kinoshita et al. |
| 6,030,316 A | 2/2000 | Kadota |
| 6,047,679 A | 4/2000 | Matsumoto et al. |
| 6,070,490 A | 6/2000 | Aschoff et al. |
| 6,070,852 A | 6/2000 | McDonnell et al. |
| 6,073,610 A | 6/2000 | Matsumoto et al. |
| 6,095,488 A | 8/2000 | Semeyn, Jr. et al. |
| 6,098,971 A | 8/2000 | Stege et al. |
| 6,104,976 A | 8/2000 | Nakamura |
| 6,105,737 A | 8/2000 | Weigert et al. |
| 6,109,241 A | 8/2000 | Engelgau |
| 6,147,590 A * | 11/2000 | Mikolcic ................... 338/153 |

* cited by examiner

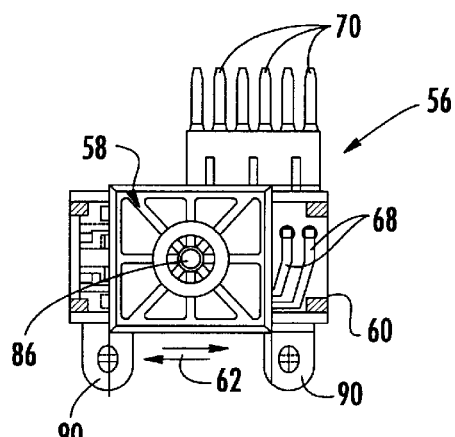
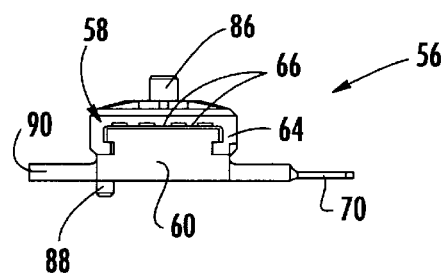
FIG. 5.  FIG. 6.
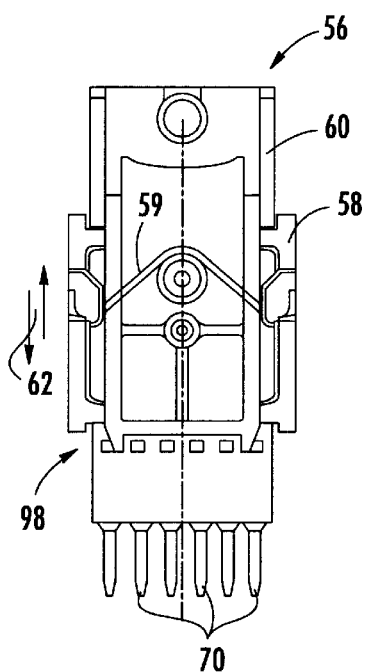 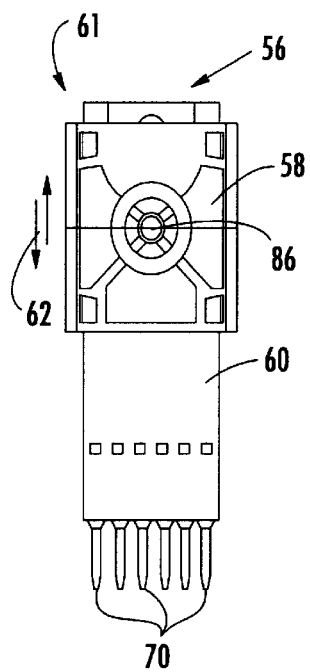 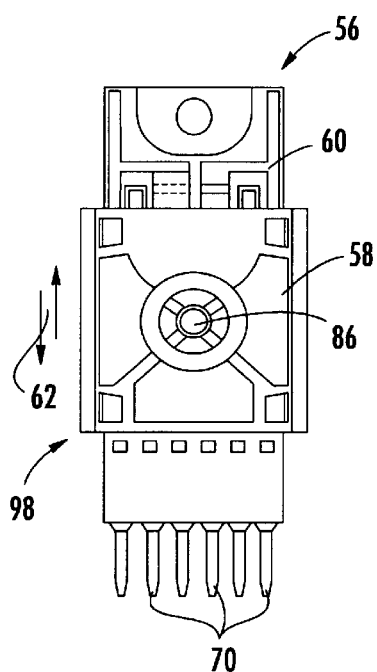
FIG. 7.  FIG. 8.  FIG. 9.

ELECTRONIC CONTROL PEDAL POSITION SENSING DEVICE ASSEMBLY METHOD

CROSS-REFERENCE TO RELATED APPLICATIONS

This application is a divisional of U.S. application Ser. No. 09/698,581, filed Oct. 27, 2000 and issuing as U.S. Pat. No. 6,460,429 for "Electronic Control Pedal and Position Sensing Device and Assembly Method," which claims the benefit of U.S. Provisional Application No. 60/162,609 filed Oct. 29, 1999, all commonly owned, both disclosures of which are hereby incorporated by reference.

FIELD OF THE INVENTION

The present invention relates to electronic throttle control devices and in particular to an electronic sensor for indicating pedal position to an electronic throttle controller.

BACKGROUND OF THE INVENTION

Electronic controls and computers are well known in the art of automotive manufacturing. It is not unusual for a late model automobile to have a computer for monitoring and controlling many of its operating systems. Typically an input stage may include data collection by sensors. The collected data is input to a processing stage where an electronic control module interprets the data and calculates appropriate output for delivery to an output stage. Actuators within the output stage convert the appropriate output to a desired physical movement. One such operating system includes the electronic throttle control (ETC). In the ETC system, often referred to as a "drive-by-wire" system, the accelerator pedal is not connected to the throttle body by a cable, as in earlier model vehicles, but rather by an electrical connection between the pedal and a throttle controller, as described by way of example in U.S. Pat. Nos. 5,524,589 and 6,073,610. As described by way of example with reference to U.S. Pat. No. 6,098,971, a potentiometer typically replaces the cable that normally runs to the throttle body and electrical wires send pedal position information to a computer. As a result, the pedal must now have its own springs. With each spring having its own feel and not a hysteresis effect as does a cable in a sheath, a spring and mechanical hysteresis device is provided for operation with the pedal for simulating the feel of a traditional early model cable styled accelerator pedal. A pedal position sensor provides an electrical voltage output responsive to pedal angular position. The pedal position sensor typically includes a resistive potentiometer having two or more resistive tracks for redundancy in providing an output signal indicative of the pedal position. Output signal faults are detected through correlation measurements between the output signals from each of the tracks. Typically, it is necessary to maintain a close tolerance on the idle and wide-open throttle output voltage signal and on stability of these signals over time.

There is a need in the industry, when using ETC pedal assemblies, to provide a way by which the idle output voltage set points are maintained despite the buildup of assembly tolerances for parts within the assembly. The set points built into the pedal and sensor assembly typically control the engine idle speed and must be maintained to a relatively tight tolerance. Two typical tolerance band specifications have emerged: either +/−3.5% or +/−1% of the reference voltage ($V_{ref}$) applied to the sensor potentiometer. It would be desirable to achieve a net build condition that meets this tolerance requirement. It would further be desirable to achieve a condition in which parts could be assembled to have a net build condition that falls within the appropriate tolerance band without the need for final assembly adjustment.

By way of example, a complicating factor in pedal position sensor assemblies is the fact that total angular travel of the sensor is relatively small, typically in the range of a 15 degree arc to a 20 degree arc. Therefore, any errors in reference angles represent a significant portion of the total sensor output. Conversely, even generous tolerances on sensor output voltage, equate to extremely tight control of sensor and pedal assembly physical dimensions. For example, and idle set-point tolerance of +/−1% $V_{ref}$ is only a +/−0.25 degree rotation of the drive shaft. There exists a need to quickly and easily calibrate a final ETC pedal assembly while maintaining an accurate and stable adjustment process. There is further a need for a position sensor which can be effectively and economically integrated with the pedal assembly without introducing a packaging problem for vehicles manufacturers while providing a robust structure able to meet the environmental conditions generally demanded.

SUMMARY OF THE INVENTION

In view of the foregoing background, it is therefore an object of the present invention to provide a pedal operable with an electronic throttle controller that can be easily and effectively calibrated and adjusted during assembly of the pedal. It is further an object of the present invention to provide a reliable yet inexpensive pedal position sensor that accurately represents pedal position.

These and other objects, advantages and features of the present invention are provided by a position sensor useful with an electronic throttle control pedal wherein the sensor comprises a potentiometer having a slider member slidable with a substrate in only a linear direction for providing an electrical output representative of a linear displacement of the slider member along the linear direction, and a drive arm rotated by a pedal shaft and operable with the slider member for providing the linear displacement to the slide member through a rotational movement of the shaft and thus the drive member. The drive arm includes a first arm member operable with a second arm member for providing a telescoping longitudinal length adjustment to the drive arm during calibration of the sensor. With a desired calibration setting of the potentiometer, the first arm member is locked to the second arm member at a fixed position along a drive arm longitudinal axis which extends radially from an axis of rotation of the pedal shaft. A slot in the first arm members has a slot longitudinal axis at a non-zero angle to the drive arm longitudinal axis with the slider member adapted for slidable movement along the slot longitudinal axis.

A method aspect of the present invention includes assembling a position sensor with an electronic throttle control pedal, wherein the pedal is operable for rotating a shaft carried by a bracket. The method comprises providing a potentiometer having a substrate and a slider member slidably connected to the substrate for movement along only a linear direction to provide an electrical output signal indicating a linear displacement of the slider member along the substrate. A drive arm having telescoping first and second arm members is adjustable along a longitudinal axis of the drive arm for fixing the drive arm at a preselected length, the first arm member having a slot for slidably receiving a coupler. The method includes connecting the second arm member to the shaft for rotation of the second arm member by the shaft responsive to movement of the pedal. During assembly, the first arm member is slid onto the second arm member in a telescoping arrangement along the longitudinal axis of the drive member. A coupler is rotatably attached to the slider member and guided into the slot. The slider member is biased toward an initial position on the substrate. The coupler then engages the slider member for moving the slider member from the initial position into an active measuring position. Measurements of the electrical signals from the potentiometer are made while continuing to slide the first arm member onto the second arm member for achieving a desired electrical signal output. Once the desired output is achieved, the first arm member is affixed to the second arm member for operation of the sensor in determining a pedal position. In one method, the initial position is below an idle position, and the desired electrical signal provides the idle position for an accelerator pedal.

BRIEF DESCRIPTION OF THE DRAWINGS

A preferred embodiment of the invention, as well as alternate embodiments are described by way of example with reference to the accompanying drawings in which:

FIGS. 5 and 6 are top plan and side elevation views of one potentiometer embodiment useful with the position sensor embodiment of FIG. 2;

FIG. 7 is a bottom plan view of a second embodiment of a potentiometer useful with the position sensor of the present invention;

FIG. 8 is a top plan view of the potentiometer of FIG. 7 illustrating an initial position of the slider member;

FIG. 9 is a top plan view of the potentiometer of FIG. 7;

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
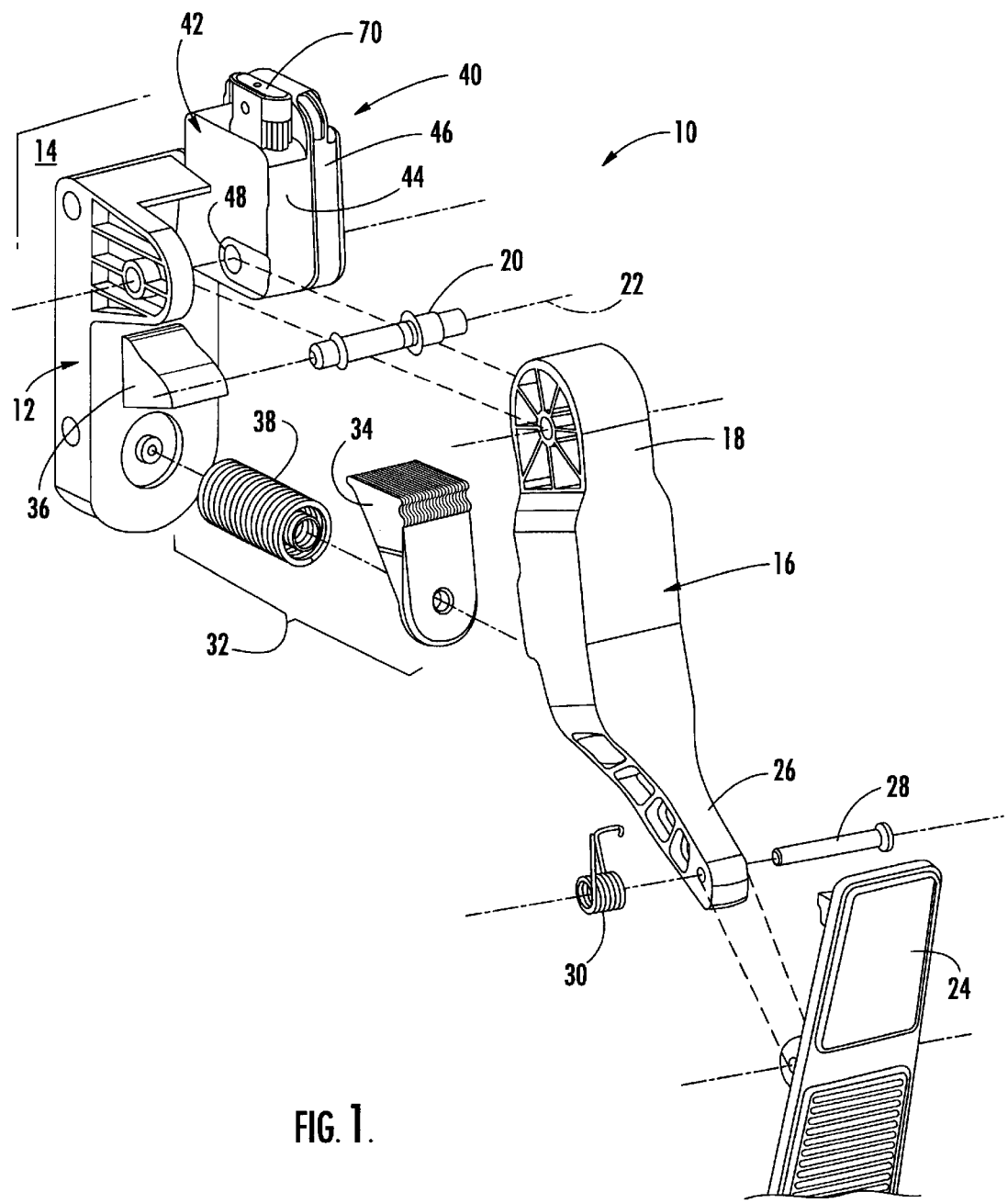
FIG. 1 is an exploded perspective view of one embodiment of an electronic throttle control pedal assembly of the present invention.

With reference initially to FIG. 1, one embodiment of the present invention is herein described for an electronic throttle control pedal assembly 10 comprising a mounting bracket 12 for mounting the pedal assembly to a vehicle wall 14, by way of example. A pedal beam 16 is rotatably attached to the mounting bracket 12 at a proximal end 18 using a shaft 20 which rotates about its longitudinal axis 22 in response to a rotation of the pedal beam about the shaft longitudinal axis. The pedal beam 16 may be contacted directly by an operator applying a force to the pedal beam during operation. For the embodiment herein described by way of example, a pedal pad 24 is rotatably connected to a distal end 26 of the pedal beam 16 using a pivot pin 28 and coil spring 30. To provide an earlier model feel to a operator similar to that of mechanical throttle cable and sheath pedals, a hysteresis device 32 is provided to simulate such a feel. The hysteresis device 32 herein described by way of example, includes friction blocks 34, 36 which interact during pedal beam movement resulting from pushing on the pedal pad 24 and during retraction of the pedal beam 16 resulting from expansion of the compression spring 38 operable between the pedal pad 16 and bracket 12.

Figure 2:
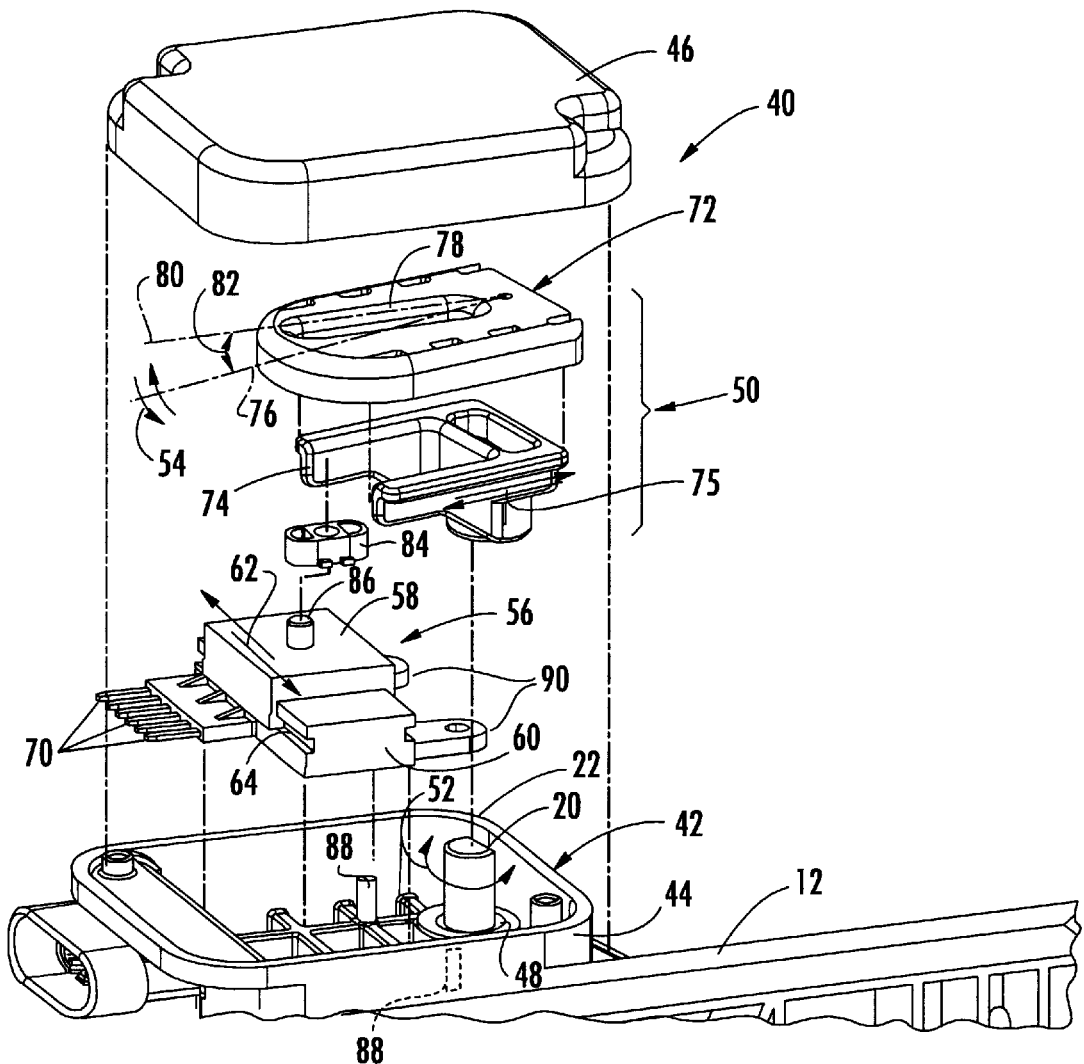
FIG. 2 is an exploded perspective view of one embodiment of a position sensor of the present invention operable with the pedal assembly of FIG. 1.

With continued reference to FIG. 1, and to FIG. 2, the pedal assembly 10 includes a position sensor 40 that is responsive to movement of the pedal pad 24 through the rotation of the pedal beam 16 which results in a rotation of the shaft 20 about the longitudinal axis 22. One embodiment of the position sensor 40, herein described by way of example for the present invention, comprises a housing 42 carried by the mounting bracket 12. In one embodiment of the present invention, the housing 42 includes a housing body 44 integrally formed with the mounting bracket 12. A cover 46 is provided for enclosing sensor elements within the body 44, as will herein be described in further detail. An opening 48 within the body 44 is provided for receiving the shaft 20 therethrough. A drive arm 50 is connected to the shaft 20 such that rotation of the shaft, illustrated by arrow 52, causes the drive arm to be rotated, as illustrated by rotation arrows 54. Rotation of the drive arm 50 in turn operates a linear potentiometer 56 for providing a voltage output signal indicative of pedal position.

Figures 3, 4:
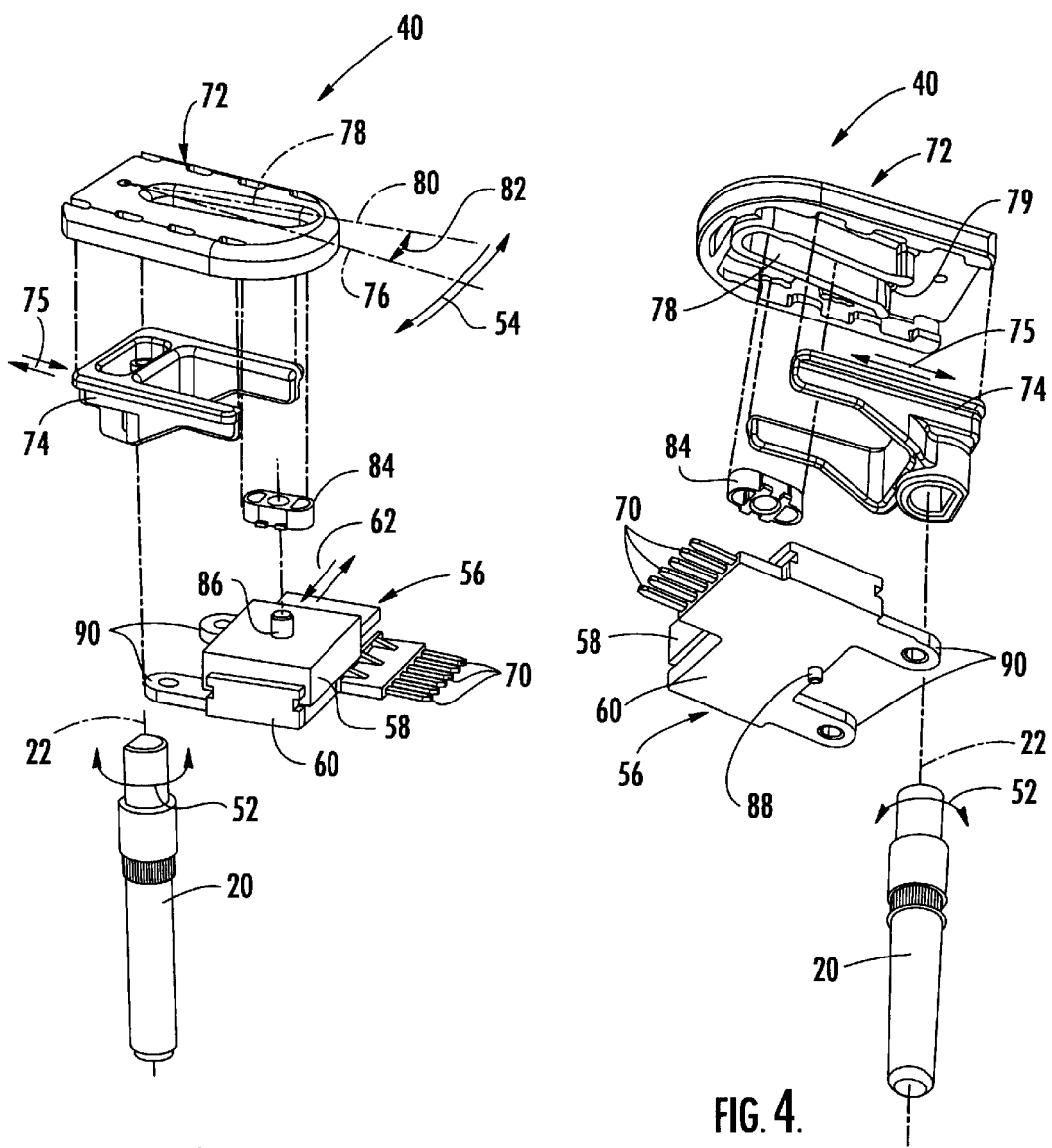
FIG. 3 is a partial exploded top view of selected elements of FIG. 2.
FIG. 4 is a partial exploded bottom view of selected elements of FIG. 2.

With continued reference to FIG. 2, and to FIGS. 3 and 4, the potentiometer 56 herein described by way of example, is carried within the housing body 44. The potentiometer 56 comprises a slider member 58 that is slidably connected to a substrate 60 such that the slider member is constrained to move in only a straight line, a linear direction, as illustrated with linear direction arrows 62. As illustrated with reference again to FIGS. 3 and 4, and to FIGS. 5 and 6, the slider member 58 is guided by a tongue and groove combination 64 of the slider member and substrate. An electrical output, a voltage signal, responsive to a linear displacement of the slider member 58 along the substrate 60 as a contact 66 of the slider member makes electrical connection with a resistive track 66 carried on the substrate, as is typical for potentiometers. By way of example, dual tracks are used to provide redundant signals. The electrical signal is then provided to electrical throttle control electronics through electrical connectors 70 extending from the substrate 60 and accessible from outside the housing 40 as illustrated with reference again to FIG. 1. As illustrated with reference to FIG. 7, the potentiometer 56 herein described for one embodiment of the present invention includes a spring 59 operable between the slider member 58 and the substrate 60 for biasing the slider member toward a preselected position 61, as illustrated with reference to FIG. 8, and as will be further detailed later in this section. As further illustrated with continued reference to FIGS. 7 and 8, and to FIG. 9, the electrical connectors 70 extend outwardly from the substrate 60 along a direction parallel to the linear direction 62, and provides a packaging alternative to the potentiometer embodiment illustrated with reference again to FIGS. 5 and 6, where the electrical connectors extends outwardly from the substrate along a direction perpendicular to the linear direction.

Figures 10, 11:
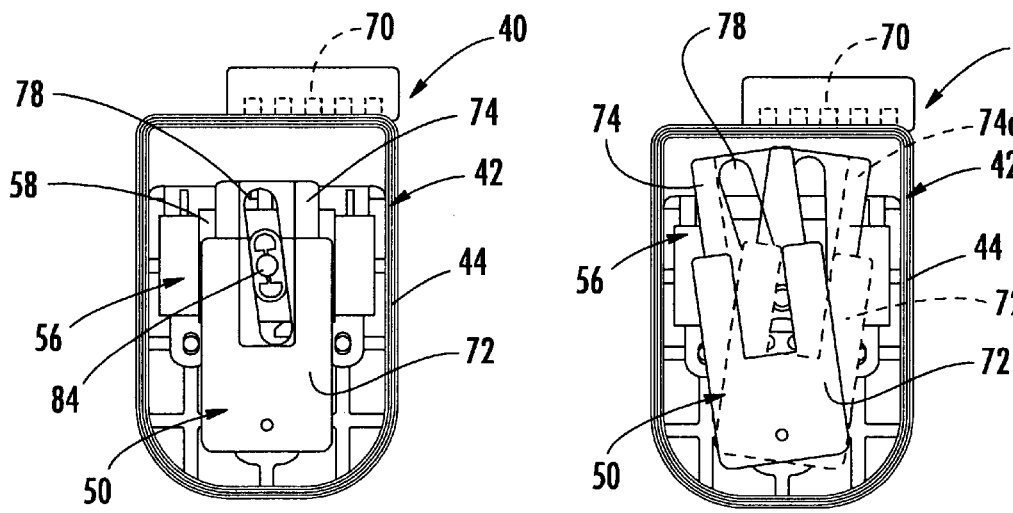
FIGS. 10 and 11 are top plan views of one embodiment of a position sensor of the present invention illustrating operating positions thereof.

With reference again to FIG. 2, and to one embodiment of the drive arm 50 of FIGS. 10 and 11, the drive arm 50 is operable, as illustrated with the positions of outer and inner arm members 72 to 72a and 74 to 74a, with the slider member 58 for providing the linear displacement to the slider member as a result of a rotational movement 52 of the shaft 20. The drive arm 50 is formed from the outer arm member 72 connected in a telescoping arrangement to the inner arm member 74 for telescoping adjustment, as illustrated by arrows 75 along a drive arm longitudinal axis 76 for locking the arm members 72, 74 at a desired fixed position to form the drive arm 50 at a desired length. The drive arm longitudinal axis 76 radially extends from the shaft axis 22 about which the shaft 20 rotates.

With continued reference to FIGS. 2–4, the drive arm 50, herein described by way of example, includes a slot 78 which is carried by the outer arm member 72. The slot 78 is elongate and has a longitudinal axis 80 positioned at a non-zero angle 82 to the drive arm longitudinal axis 76. A coupler 84 is slidable within the slot 78 through a open end guide portion 79, illustrated with the perspective view of FIG. 4, and is connected to the slider member 58 by a pin 86 extending from the slider member. The coupler 84 operates between the slider member 58 and the drive arm 50 for providing the linear displacement 62 to the slider member resulting from the rotation 54 of the drive member 50 in turn resulting from rotation 52 of the shaft 20 which rotation is a result of movement of the pedal beam 16, directly or from movement by a force placed on the pedal pad 24, as earlier described with reference to FIG. 1.

With reference again to FIGS. 5 and 6, the tracks 68, electrical traces formed on the top surface of the substrate 60 are formed in a straight line within a desired range of interest for providing an output voltage. It is expected that various lengths of tracks 68 will be used as desired, without departing from the teachings of the present invention. The simple straight line shape of the tracks 68 reduces costs and complexity in the production of the potentiometer 56 and ultimately provides ease in assembly and low cost for the position sensor 40. As illustrated with reference again to FIGS. 2, 5 and 6, the potentiometer 56 is accurately positioned within the housing 42 using locator pins 88 carried on the backside of the substrate and within the housing body 44, by way of example, which locator pins fit into the side wall portion of the pedal bracket, and into tabs 90 carried by the potentiometer 56. It is expected that alternate connection techniques will be used based on the teachings of the present invention without departing from its intent. One embodiment of the housing 42 as herein described with reference again to FIG. 1, is integrally formed with the mounting bracket 12 and includes the removable cover 46 which is sealed to the housing body 44 as part of the sensor assembly.

During one assembly of the sensor 40, and with reference again to FIGS. 2–4, the inner arm member 74 of the drive arm 50 is pressed onto the pedal shaft 20, which shaft has a keyed styled end. The drive arm 50 interfaces with the potentiometer 56 through the coupler 84 which is slidable within the slot 78 in the outer arm member 72 and connected to the pin 86 of the slider member 58 which itself is constrained to move linearly in a straight line direction 62 across the substrate 60.

Figure 12:
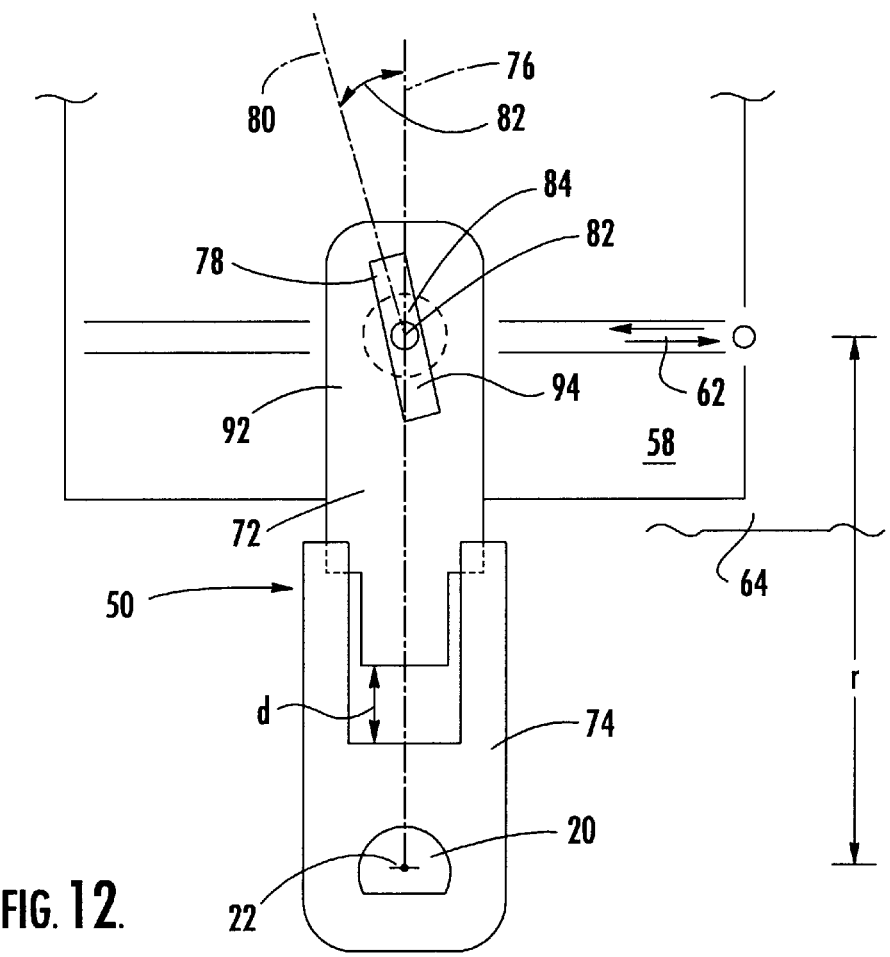
FIG. 12 is a partial schematic plan view of a drive member operable with a slider member of a potentiometer.

As described, and with reference again to FIG. 2 to allow linear tracking motion as the drive arm 50 rotates through its angular travel, the drive arm includes the slot 78 which closely carries the coupler 84 within the slot 78 in order to prevent a backlash affect. There is a similar snug fit of the coupler 84 to the pin 86 in the slider member 58. An alternate construction, as illustrated with reference to FIG. 12, includes a loose fitting coupler 84 with a separate spring 92 biasing the coupler to one side 94 of the slot 78.

Figure 13:
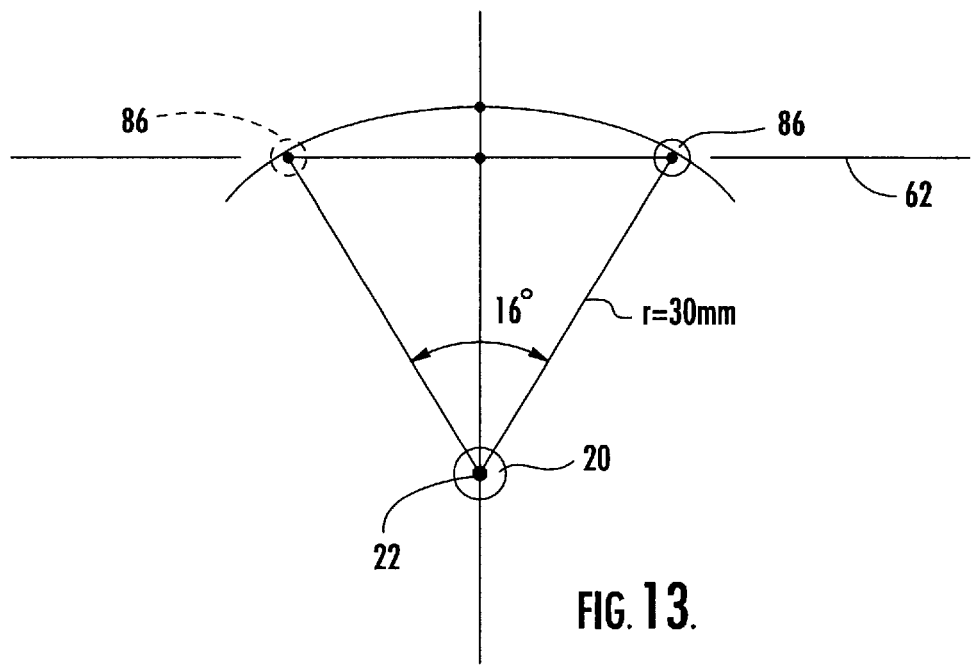
FIG. 13 is a geometric illustration, not to scale, illustrating an adjustment feature for one embodiment of the present invention.

With reference again to FIGS. 1–4, the telescoping drive arm 50 desensitizes the adjustment and calibration process. The range of adjustment required to compensate for tolerances in both the potentiometer 56 and mechanical elements of the pedal assembly 10 is in general approximately +/−1 mm with reference to movement of the slider member 58 permitted over the tracks 68. The telescoping drive arm 50, including the slot 78 positioned at the angle 82 to the axis 76, provides a mechanical advantage that allows a relatively large telescoping adjustment displacement 75 of the arm member 72 of the telescoping drive arm 50 relative to the arm member 74 to achieve a small displacement of the slider member 58. This mechanical advantage can be expressed by $\cot \Theta$, with $\Theta$ being the non-zero angle 82 between axises 76, 80. By way of example, one calculation of the slot angle 82 and travel distance along the linear direction 62 may be described as a sample adjustability analysis. The analysis of range of final assembly adjustment needed for the telescoping drive arm as herein described, is as follows and described with reference to FIGS. 12 and 13.

Sensor total output travel required per automotive product specification:

| | |
|---|---|
| Output at idle stop | 20% Vref |
| Output at wide open throttle stop | 84% Vref |
| Total active sensor travel | 64% Vref |

For a typical 16° pedal rotation, sensitivity of sensor action=4%/degree

Sensor track length for a typical 30 mm drive arm=8.35 mm

Sensitivity in terms of track linear dimension=0.522 mm/degree

Idle set-point accuracy requirement, from a typical spec.=+/−3.5% Vref=+/−0.875° at drive shaft (for 16° total rotation)=+/−0.46 mm at sensor track Assembly tolerance analysis: A typical potentiometer tolerance +/−0.43 mm at sensor track=+/−3.3°

Final assembly tolerance on insertion of shaft assume +/−1°=+/−0.52 mm

Total assumed tolerance +/−0.95 mm referred to potentiometer track (the tolerance band due to assembly variation and thus continues the need for an accurate calibration)

Let sensor track adjustment=+/−0.95 mm

Telescoping arm adjustability:

Telescoping arm adjustment sensitivity is set by the slot angle, $\Theta$. The sensitivity is $1./\tan \Theta$.

Telescoping distance, $d = a/\tan \Theta$. For $\Theta=6°$, $d=+/−9.04$ mm

By way of further example, and with reference again to FIG. 2, for one sensor assembly process, the two arm members 72, 74 of the telescoping drive arm 50 are slid together and the coupler 84 placed in the slot 78 of the outer arm member 72. The drive arm members 72, 74 interlock and slide with a snug fit. The drive arm 50 is then positioned onto the shaft 20 and the coupler 84 positioned onto the slider pin 86. The connectors 70 are then connected to test equipment. The telescoping drive arm 50 is adjusted in length at one pedal position or, alternatively, with a servo drive device, until a voltage representing an idle setting is centered within a desirable tolerance band. The arm members 72, 74 of the telescoping drive arm 50 are then, by way of one example, laser welded to fix the length of the drive arm. Fastening with screws or rivets are further examples. Laser welding does not require that pressure be placed against the drive arm members, thus adding to the assurance that parts being assembled will remain in place until fixed at desired locations. The materials are chosen so that the top plastic member is transparent at a frequency of the laser, while the bottom member contains carbon black, by way of example, for absorbing energy from the laser. The laser thus creates localized heating in the bottom part that will melt one piece and fuse the members together.

In another assembly process, and with continued reference to FIG. 2, the drive arm inner member 74 is pressed in place onto the shaft 20. Then the drive arm outer member 72 is slid in place on the end of the drive arm inner member. The wall of the housing 42 has a height to allow such steps. The slot 78 in the drive arm outer member 72 is open-ended 79, as earlier described with reference to FIG. 4, for providing a guide to the coupler 84, which is rotatably attached to the slider member 58 via the slider pin 86. The potentiometer 56, as installed and as illustrated with reference again to FIGS. 7 and 8, is spring biased by spring 79 to a rest position 61 below the idle setting. As the drive arm outer member 72 engages the coupler 84, the potentiometer slider member 58 comes off of the rest position, the preselected position 61 and moves into an active range 98, illustrated with reference again to FIGS. 7 and 9. As the drive arm outer member 72 is further slid onto the inner member 74, the potentiometer voltage output signal increases until the desired idle position analog voltage is achieved.

This assembly process is well suited to automation. By way of example, a robot positions the drive arm until the calibration voltage for idle setting is achieved. Then a laser is fired to weld the inner and outer drive arm members together. Next the laser welds the cover to the housing body. The process also allows the critical calibration elements to be assembled and adjusted without human intervention to hold or fixture the elements.

By way of further example, the present invention provides advantages over known prior art techniques. The final assembly calibration process is desensitized. Mechanical adjustment of the potentiometer to the calibration idle voltage setting in an ETC pedal is known to be a challenge. Adjustment is quite sensitive to small angles involved. The slotted telescoping drive arm provides approximately a ten to one amplification of the adjustment motion relative to the actual potentiometer motion and thus provides such desensitizing of the adjustment and calibration process. The present invention facilitates a low-cost automated adjustment process. The adjustment and calibration using the elements herein described can be easily automated using a robotic laser welding process well known in the art. This eliminates the need for handling the drive arm elements or applying a force to hold or fixture the elements as they are fixed together. As is well known, handling and fixturing of such elements can adversely affect calibration of the sensor. The need to accurately and easily adjust an ETC pedal is thus satisfied by the present invention. The sensor interface with the pedal and adjustment features herein described facilitates the use of a robust, low-cost sensor. The potentiometer, herein described by way of example, includes a simple plastic substrate and a linear sliding contact. The housing is formed with the structural pedal bracket as earlier described. Problems of concentricity and mechanical loads affecting sensor output are avoided, unlike typical rotary position sensors used in the art.

Figure 14:
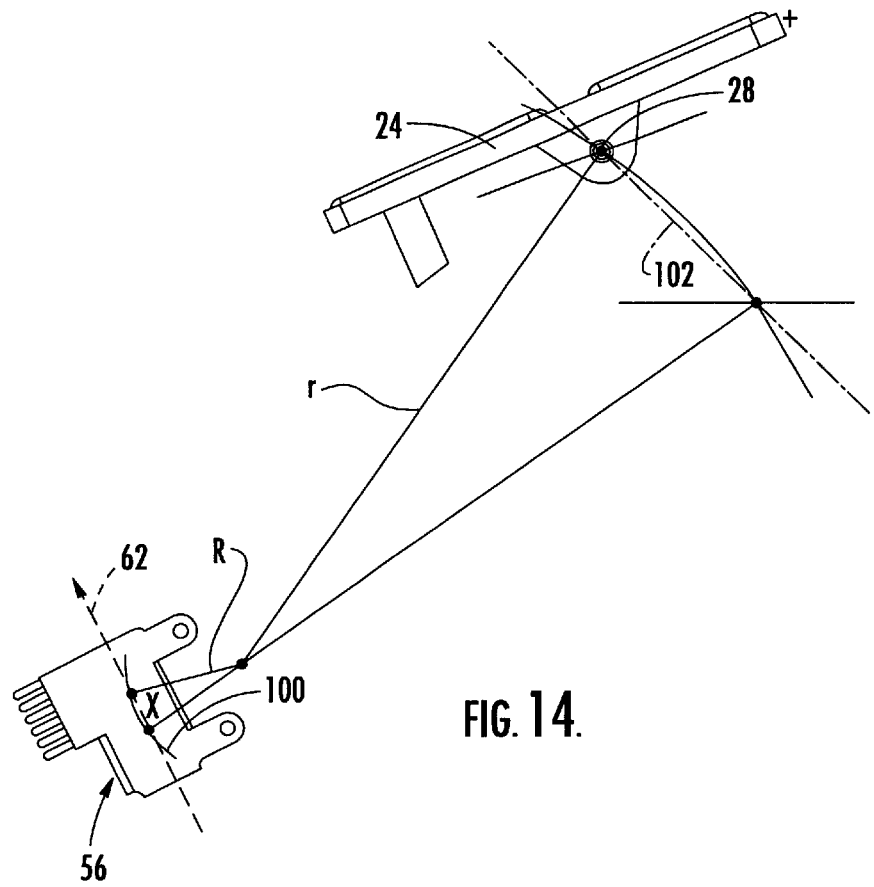
FIG. 14 is a schematic illustration of a drive arm operable with a slider member of a potentiometer styled sensor cassette.

Further, and as illustrated with reference to FIG. 14, the linear potentiometer 56 would appear to introduce a linearity error as the coupler 84, earlier described with reference to FIG. 2, by way of example, traverses the cord 100, illustrated with reference to FIG. 14, produced by the drive arm motion. However, this is actually a benefit providing an output analogous to the linear travel 102 of the accelerator pedal pad 24. It is desirable for the potentiometer output voltage to be proportional to the accelerator pedal linear displacement. The linear potentiometer provides a ratio of slider member travel to pedal travel by the ratio of r/R. Available sensor substrates, as herein described for the potentiometer, can accommodate a range of pedal travel and pedal length combinations by adjusting only the length of the drive arm. Also with the slotted and angled slot of the drive arm, a range of non-linear output voltage versus pedal position can be generated, if desired, by simply rotating the axis of the substrate about the drive axis at an interface point.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

Referring initially to FIG. 1,

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for assembling a position sensor with an electronic control pedal wherein the pedal is operable for rotating a shaft carried by a bracket, the method comprising:

providing a potentiometer having a substrate and a slider member slidably connected to the substrate for movement along only a linear direction, the slider member making an electrical contact with resistive tracks carried on the substrate for providing an electrical output signal representative of a linear displacement of the slider member along the substrate;

attaching the substrate to the bracket;

providing a drive arm having telescoping first and second members adjustable along a longitudinal axis of the drive arm for fixing the drive arm at a preselected length, the first arm member having a slot for slidably receiving a coupler therein;

connecting the shaft to the second arm member for rotation of the second arm member;

telescoping the second arm with the first arm member for extending drive arm along the longitudinal axis;

coupling the first arm member with the slider member for providing a sliding movement of the slider member within the slot during a rotating of the drive arm; telescoping the first and second drive arm members to a preselected length dimension of the drive arm for positioning the slider member at a desired location within the slot;

securing the first arm member to the second arm member.

2. The method of claim 1, wherein the securing comprises welding the first arm member to the second, member for locking the drive arm at the preselected length.

3. The method according to claim 1, further comprising:

positioning the slider member at a preselected location along the linear direction on the substrate;

measuring the electrical output signal from the potentiometer with the slider member at the preselected location; and rotating the shaft for placing the slider member at a preselected position within the slot while at the preselected location.

4. The method according to claim 3, wherein the preselected position is within a preselected tolerance band of output signal values.

5. The method according to claim 1, further comprising inserting a coupler into the slot and engaging the coupler with the slider member.

6. The method according to claim 1, wherein a longitudinal axis of the slot along which axis the slider member is guided is oriented at a non-zero angle to the longitudinal axis of the drive arm.

7. A method for assembling a position sensor for operation with an electronic control pedal wherein the pedal is operable for rotating a shaft carried by a bracket, the method comprising:

providing a potentiometer having a substrate and a slider member slidably connected to the substrate for movement along only a linear direction, the slider member making an electrical contact with an electrically resistive element carried on the substrate for providing an electrical output signal representative of a linear displacement of the slider member along the substrate;

attaching the substrate to the bracket;

providing a drive arm having a slot;

connecting one end of the drive arm to the shaft for rotation by the shaft; and coupling an opposing end the drive arm to the slider member for providing a sliding movement thereto within the slot resulting from a rotating of the drive arm.

8. The method according to claim 7, wherein the drive arm providing step comprises:

the drive arm having telescoping first and second arm members adjustable along a longitudinal axis of the drive arm for fixing the drive arm at a preselected length, the first arm member having the slot therein;

connecting the shaft to the second arm member;

telescoping the second arm with the first arm member for extending drive arm along the longitudinal axis;

coupling the first arm member with the slider member;

telescoping the first and second drive arm members to preselected length dimension for the drive arm so as to position the slider member at a desired location within the slot; and securing the first arm member to the second arm member.

9. The method according to claim 8, wherein the securing comprises welding the first arm member to the second, member for locking the drive arm at the preselected length.

10. The method according to claim 7, further comprising:

positioning the slider member at a preselected location along the linear direction on the substrate;

measuring the electrical output signal from the potentiometer with the slider member at the preselected location; and rotating the shaft for placing the slider member at preselected position within the slot while at the preselected location.

11. The method according to claim 10, wherein the preselected position provides an electrical representing the idle setting.

12. The method according to claim 10, wherein the preselected position is within a preselected tolerance band of output signal values.

13. The method according to claim 7, further comprising inserting a coupler into the slot and engaging the coupler wit the slider member.

14. The method according to claim 7, wherein a longitudinal axis of the slot along which axis the slider member is guided is oriented at a non-zero angle to the longitudinal axis of the drive arm.

* * * * *